(12) United States Patent
Ameri (10) Patent No.: US 11,204,267 B2
(45) Date of Patent: Dec. 21, 2021

(54) CONTINUOUSLY ADAPTIVE DIGITAL COIL DRIVER FOR MAGNETIC FLOWMETER

(71) Applicant: Micro Motion, Inc., Boulder, CO (US)

(72) Inventor: Masoud Ameri, Maple Plain, MN (US)

(73) Assignee: MICRO MOTION, INC., Boulder, CO (US)

( * ) Notice: Subject to any disclaimer, the term of this patent is extended or adjusted under 35 U.S.C. 154(b) by 156 days.

(21) Appl. No.: 16/587,615

(22) Filed: Sep. 30, 2019

(65) Prior Publication Data

US 2021/0072056 A1    Mar. 11, 2021

Related U.S. Application Data

(60) Provisional application No. 62/896,120, filed on Sep. 5, 2019.

(51) Int. Cl.
*G01F 1/60* (2006.01)
*G01F 1/58* (2006.01)

(52) U.S. Cl.
CPC .............. *G01F 1/60* (2013.01); *G01F 1/586* (2013.01)

(58) Field of Classification Search
None
See application file for complete search history.

(56) References Cited

U.S. PATENT DOCUMENTS

| | | |
|---|---|---|
| 4,167,871 A | 9/1979 | Shauger et al. |
| 4,193,298 A | 3/1980 | Kayama et al. |
| 4,229,703 A | 10/1980 | Bustin |
| 4,784,000 A | 11/1988 | Gaertner |
| 5,325,728 A | 7/1994 | Zimmerman et al. |
| 5,372,045 A | 12/1994 | Schulz et al. |
| 5,530,639 A | 6/1996 | Schulz et al. |
| 5,639,970 A | 6/1997 | Schulz |
| 5,874,818 A | 2/1999 | Schuurman |

(Continued)

FOREIGN PATENT DOCUMENTS

| | | |
|---|---|---|
| CA | 2 306 666 | 3/1991 |
| CN | 1170125 | 10/2004 |

(Continued)

OTHER PUBLICATIONS

Office Action from Chinese Patent Application No. 202020151175.3, dated Jul. 7, 2020.

(Continued)

*Primary Examiner* — Harshad R Patel
(74) *Attorney, Agent, or Firm* — Westman, Champlin & Koehler, P.A.

(57) ABSTRACT

A magnetic flowmeter for measuring a fluid flow includes flow tube assembly receiving the flow having a coil with first and second coil wires for receiving a coil current to produce a magnetic field in the fluid. This generates an EMF in the fluid representative of the flow. An EMF sensor is arranged to sense the EMF and generate an output related to the flow rate. Current supply circuitry provides the coil current to the first and second wires of the coil in response to a command signal. A digital control circuit provides the command signal to the current supply circuitry as a function of a control algorithm. In one aspect, the control algorithm is adapted to changes in electrical parameters of the coil. A method of implementing the magnetic flowmeter is also provided.

19 Claims, 7 Drawing Sheets

(56) References Cited

U.S. PATENT DOCUMENTS

| | | | |
|---|---|---|---|
| 5,905,206 A | 5/1999 | Herwig et al. | |
| 6,269,701 B1 | 8/2001 | Keech | |
| 6,644,127 B1 | 11/2003 | Matzen | |
| 6,697,742 B1 | 2/2004 | Franklin et al. | |
| 6,763,729 B1 | 7/2004 | Matzen | |
| 7,688,057 B2 | 3/2010 | Foss et al. | |
| 7,779,702 B2 | 8/2010 | Shanahan | |
| 7,921,733 B2 | 4/2011 | Foss et al. | |
| 9,163,968 B2 | 10/2015 | Foss et al. | |
| 9,175,993 B2 | 11/2015 | Hunter et al. | |
| 9,182,258 B2 | 11/2015 | Rovner | |
| 9,228,869 B2 | 1/2016 | Hunter et al. | |
| 9,395,221 B2 | 7/2016 | Foss et al. | |
| 9,696,188 B2 | 7/2017 | Rogers et al. | |
| 9,952,075 B2 | 4/2018 | Foss et al. | |
| 10,663,331 B2 | 5/2020 | Foss et al. | |
| 2006/0081067 A1 | 4/2006 | Budmiger | |
| 2010/0107776 A1 | 5/2010 | Shanahan | |
| 2013/0333484 A1* | 12/2013 | Henry | G01F 1/8431 73/861.356 |
| 2015/0082906 A1 | 3/2015 | Foss et al. | |
| 2015/0082909 A1 | 3/2015 | Foss et al. | |
| 2015/0177035 A1 | 6/2015 | Rovner et al. | |
| 2017/0115146 A1 | 4/2017 | Shi | |

FOREIGN PATENT DOCUMENTS

| | | |
|---|---|---|
| CN | 107478279 | 12/2017 |
| CN | 107560676 | 1/2018 |
| DE | 10 2004 046 238 | 3/2006 |
| EP | 1 260 797 | 11/2002 |
| EP | 2 167 922 | 4/2019 |
| FR | 2 521 289 | 8/1983 |
| GB | 2 348 964 | 4/2000 |
| JP | 3-122523 | 5/1991 |
| RU | 2 584 384 | 5/2016 |
| RU | 2 645 834 | 2/2018 |
| WO | WO 2009/008974 | 1/2009 |
| WO | WO 2009/154112 | 12/2009 |
| WO | WO 2018/215034 | 11/2018 |

OTHER PUBLICATIONS

International Search Report and Written Opinion of the International Searching Authority from International Application No. PCT/US2020/024656, dated Jul. 8, 2020.

International Search Report and Written Opinion of the International Searching Authority from International Application No. PCT/US2020/047775, dated Nov. 19, 2020.

International Search Report and Written Opinion of the International Searching Authority from International Application No. PCT/US2020/047432, dated Nov. 25, 2020.

International Search Report and Written Opinion of the International Searching Authority from International Application No. PCT/US2020/047609, dated Dec. 16, 2020.

Office Action from U.S. Appl. No. 16/587,886, dated May 14, 2021.

Office Action from U.S. Appl. No. 16/588,012, dated May 28, 2021.

* cited by examiner

CONTINUOUSLY ADAPTIVE DIGITAL COIL DRIVER FOR MAGNETIC FLOWMETER

CROSS-REFERENCE TO RELATED APPLICATION

The present application is based on and claims the benefit of U.S. provisional patent application Ser. No. 62/896,120, filed Sep. 5, 2019, the content of which is hereby incorporated by reference in its entirety.

BACKGROUND

Embodiments of the present disclosure relate to magnetic flowmeters and, more specifically, to techniques for controlling the current used to generate a magnetic field used in flow rate measurements.

Precise and accurate flow control is critical to a wide range of fluid processing applications, including bulk fluid handling, food and beverage preparation, chemistry and pharmaceuticals, water and air distribution, hydrocarbon extraction and processing, environmental control, and a range of manufacturing techniques utilizing thermoplastics, thin films, glues, resins and other fluid materials, for example. Flow rate measurement technologies used in each particular application depend upon the fluids involved, and on the relevant process pressures, temperatures and flow rates.

Exemplary flow rate measuring technologies include turbine devices that measure flow as a function of mechanical rotation, pitot sensors and differential pressure devices that measure flow as a function of the Bernoulli effect or pressure drop across a flow restriction, vortex and Coriolis devices that measure flow as a function of vibrational effects, and mass flowmeters that measure flow as a function of thermal conductivity. Magnetic flowmeters are distinguished from these technologies by characterizing a flow based on Faraday's Law, which depends upon electromagnetic interactions rather than mechanical or thermodynamic effects. In particular, magnetic flowmeters rely upon the conductivity of the process fluid, and the electromotive force (EMF) induced as the fluid flows through a region of magnetic field.

Conventional magnetic flowmeters include a sensor section and a transmitter section. The transmitter section includes a coil driver that drives a current through a coil of the sensor section to generate a magnetic field across the pipe section. The magnetic field induces the EMF or potential difference (voltage) across the flow that is proportional to the velocity of the flow. The magnetic flowmeter measures the flow rate based on the voltage difference, which is detected by the sensor section.

Current supply circuitry in the flowmeter is used to apply an alternating current to the magnetic coil. The supply circuitry includes an H-bridge transistor circuit having first and second switches which couple one of the first and second coil wires to a supply conductor. Third and fourth switches of the bridge circuit couple the other of the first and second coil wires to a second supply conductor. A control circuit periodically alternates conduction of the first, second, third and fourth switches to reverse the polarity of the coil current. An alternating current applied to an inductive load can be difficult to control and may introduce errors in flow measurements.

SUMMARY

A magnetic flowmeter for measuring a fluid flow includes flow tube assembly receiving the flow having a coil with first and second coil wires for receiving a coil current to produce a magnetic field in the fluid. This generates an EMF in the fluid representative of the flow. An EMF sensor is arranged to sense the EMF and generate an output related to the flow rate. Current supply circuitry provides the coil current to the first and second wires of the coil in response to a command signal. A digital control circuit provides the command signal to the current supply circuitry as a function of a control algorithm. In one aspect, the control algorithm is adapted to changes in electrical parameters of the coil. A method of implementing the magnetic flowmeter is also provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form, in order to avoid obscuring the embodiments in unnecessary detail.

Magnetic flowmeters are used to measure flow of the fluids. Magnetic flowmeters operate in accordance with Faraday's Law of electromagnetic induction to measure flow of the conductive liquid through a pipe. In a magnetic flowmeter, a coil is used to apply a magnetic field to the conductive fluid. In accordance with Faraday's Law, the movement of the conductive fluid through the magnetic field generates an EMF (voltage) which can be sensed using sense electrodes. The magnitude of this voltage is proportional to the flow rate of the conductive process fluid.

In magnetic flowmeters, in order to increase the signal to noise (1/f) ratio, high frequency current reversal is needed. The coil driver needs to control the current with minimum/no overshoot and provide fast settling times before electrode voltage is measured. Tight optimum current control loop is essential to increase system performance. Magnetic Flow tube coil drivers are required to work with different sizes of flow tubes. Flow tubes parameters change over time and temperature. A coil driver system identifies the impedance of the attached flow tube upon powerup and continuously monitors any parameter changes and provides optimum current control.

Figure 1:
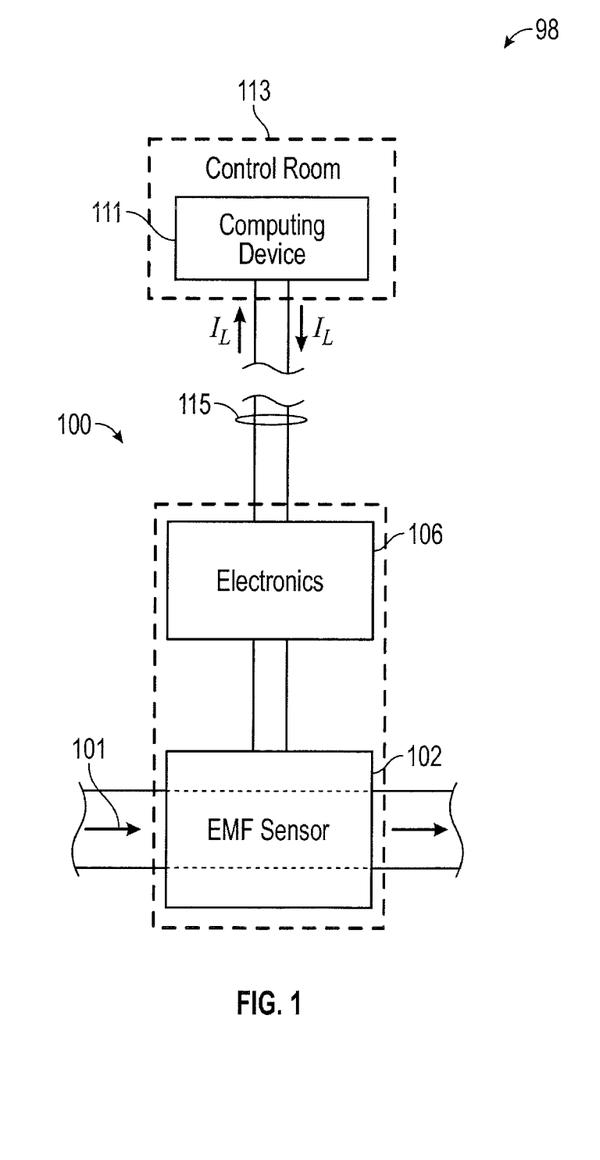
FIG. 1 is a simplified diagram of an exemplary industrial process measurement system, in accordance with embodiments of the present disclosure.

FIG. 1 is a simplified diagram of an exemplary industrial process measurement system 98, in accordance with embodiments of the present disclosure. The system 98 may be used in the processing of a material (e.g., process medium) to transform the material from a less valuable state into more valuable and useful products, such as petroleum, chemicals, paper, food, etc. For example, the system 98 may be used in an oil refinery that performs industrial processes that can process crude oil into gasoline, fuel oil, and other petrochemicals.

The system 98 includes a pulsed direct current (DC) magnetic flowmeter 100 that is configured to sense a flow rate of a process fluid flow 101, such as through a pipe or flow tube 102, for example. The magnetic flowmeter 100 includes an electromotive force (EMF) sensor 316 (see FIGS. 4A, 4B) and flowmeter electronics 106. The sensor 316 is generally configured to measure or sense the flow rate of the fluid flow 101. The electronics 106 are generally configured to control the applied magnetic field to measure the flow rate, and optionally communicate the measured flow rate to an external computing device 111, such as a computerized control unit, which may be remotely located from the flowmeter 100, such as in a control room 113 of the system 98.

The electronics 106 may communicate with the external computing device 111 over a suitable process control loop. In some embodiments, the process control loop includes a physical communication link, such as a two-wire control loop 115, or a wireless communication link. Communications between the external computing device 111 and the flowmeter 100 may be performed over the control loop 115 in accordance with conventional analog and/or digital communication protocols. In some embodiments, the two-wire control loop 115 includes a 4-20 milliamp control loop, in which a process variable may be represented by a level of a loop current $I_L$ flowing through the two-wire control loop 115. Exemplary digital communication protocols include the modulation of digital signals onto the analog current level of the two-wire control loop 115, such as in accordance with the HART® communication standard. Other purely digital techniques may also be employed including Foundation Fieldbus and Profibus communication protocols. Exemplary wireless versions of the process control loop include, for example, a wireless mesh network protocol, such as WirelessHART® (IEC 62591) or ISA 100.11a (IEC 62734), or another wireless communication protocol, such as WiFi, LoRa, Sigfox, BLE, or any other suitable protocol.

Power may be supplied to the magnetic flowmeter 100 from any suitable power source. For example, the magnetic flowmeter 100 may be wholly powered by the loop current $I_L$ flowing through the control loop 115. One or more power supplies may also be utilized to power the process magnetic flowmeter 100, such as an internal or an external battery. An electrical power generator (e.g., solar panel, a wind power generator, etc.) may also be used to power the magnetic flowmeter 100, or charge a power supply used by the magnetic flowmeter 100.

Figure 2:
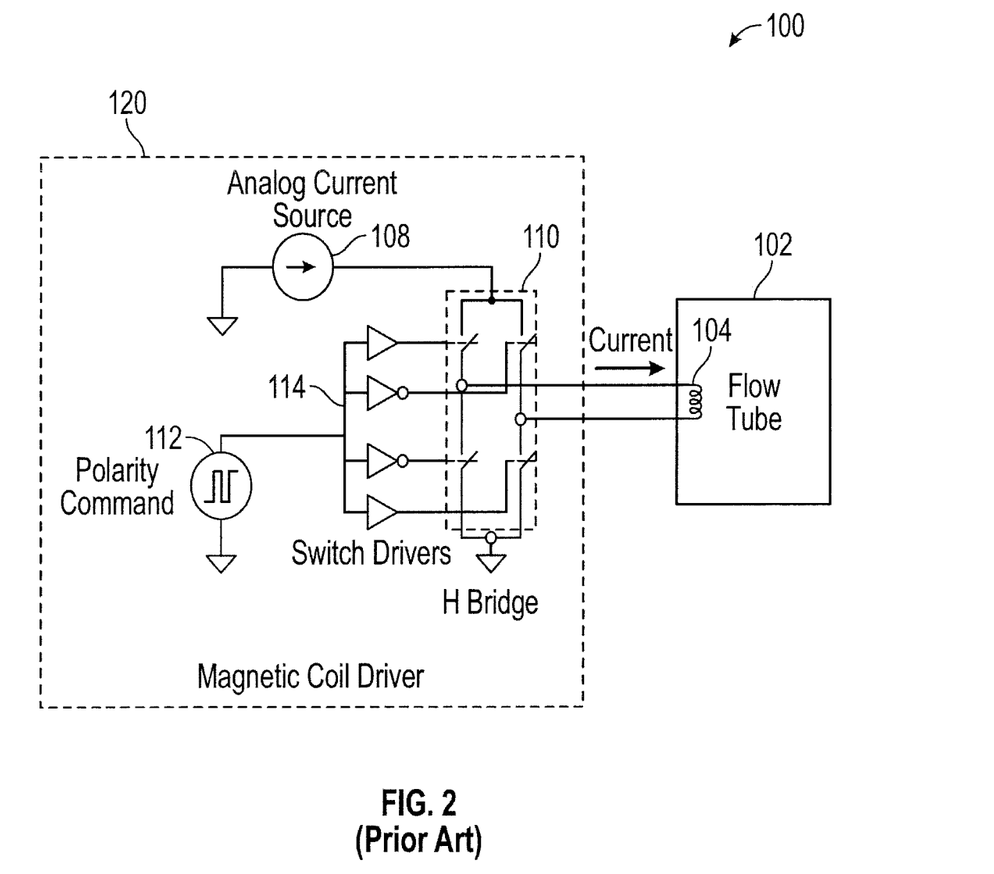
FIG. 2 is a simplified electrical diagram of a prior art coil driver for a magnetic flowmeter.

FIG. 2 is a simplified block diagram of coil drive circuitry 120, which may form a portion of the electronics 106 (FIG. 1), in a prior art magnetic flowmeter. Flow tube 102 includes a coil 104 which is electrically connected to a drive circuitry 120. The drive circuitry 120 includes an analog current source 108 connected to an H Bridge circuit 110. The H Bridge circuit 110 includes four switches (typically transistors) which are driven by a polarity command signal source 112. The output from the signal source is fed through switch drivers 114 such that at any given time current applied to the coil 104 in the direction indicated by the arrow in FIG. 2 or, alternately, in the opposite direction.

In traditional magnetic flowmeter coil drivers, current source 108 and H Bridge 110 are used to inject a square current wave into the coil 104 of the flow tube 102. The magnetic flowmeter controls a current set point and the H Bridge 110 is used to set the polarity (direction) of the current applied to the coil 104. As one coil driver circuit design may be used to power different size flow tubes, after identifying the impedance of the attached flow tube, the drive circuitry 120 is configured by selecting one of several different control schemes to control the current into the coil 104 which changes the current profile to compensate for parameter variations between flow tubes 102. Each control scheme can control current to a set of flow tubes. However, the control schemes may not be optimized for any given flow tube. In addition, when the current reverses, the current source 108 can become unstable due to free-wheeling current in an inductive coil 104. During this period, the operating voltage range of the controller can be exceeded until the coil driver recovers. Further, the coil driver or drive circuitry 120 may not work with newly designed flow tube configurations thus requiring the circuitry to be re-designed.

Figure 3:
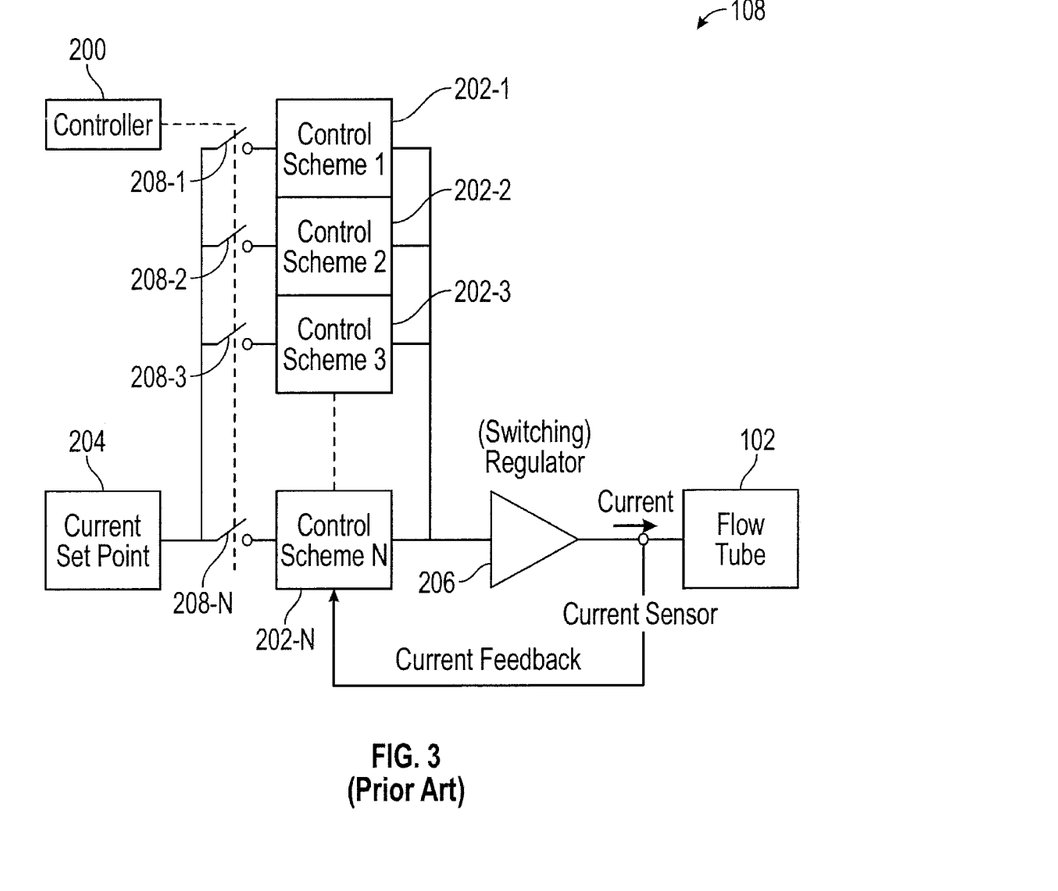
FIG. 3 is a block diagram of a current source for use in a magnetic flowmeter current driver.

FIG. 3 shows a typical traditional current source 108 configuration used in magnetic flowmeter coil drives used to generate a desired current profile. A control scheme is selected based upon knowledge of flow tube impedance. In the diagram of FIG. 3, a controller 200 selects a desired current control scheme 202-1, 202-2, 202-3 . . . 202-N using respective switches 208-1, 208-2, 208-3 . . . 208-N. The control schemes can be implements analog circuitry. A current set point 204 is used and the current is applied though a regulator 206 to the coil of the flow tube 102. A feedback current is applied to the control scheme for use by the selected control algorithm. The particular control scheme can be in accordance with known control algorithm techniques. For example, a PID (Proportional Integral Derivative) algorithm can be used including those that use feedback and/or feed forward signals. In general, a good controller is one that minimizes the response time and/or tracks the command signal as close as possible.

When the flow tube is installed, the particular impedance and the desired current drive characteristics are used to select the appropriate control scheme 202-1 through 202-N. The controller 200 can comprise a microcontroller or other circuitry as desired. However, such a configuration is limited to predetermined control schemes. Further, as electrical characteristics of the coil of the flow tube 102 change over time, a typical traditional control scheme does not adjust to these changes.

Figure 4A:
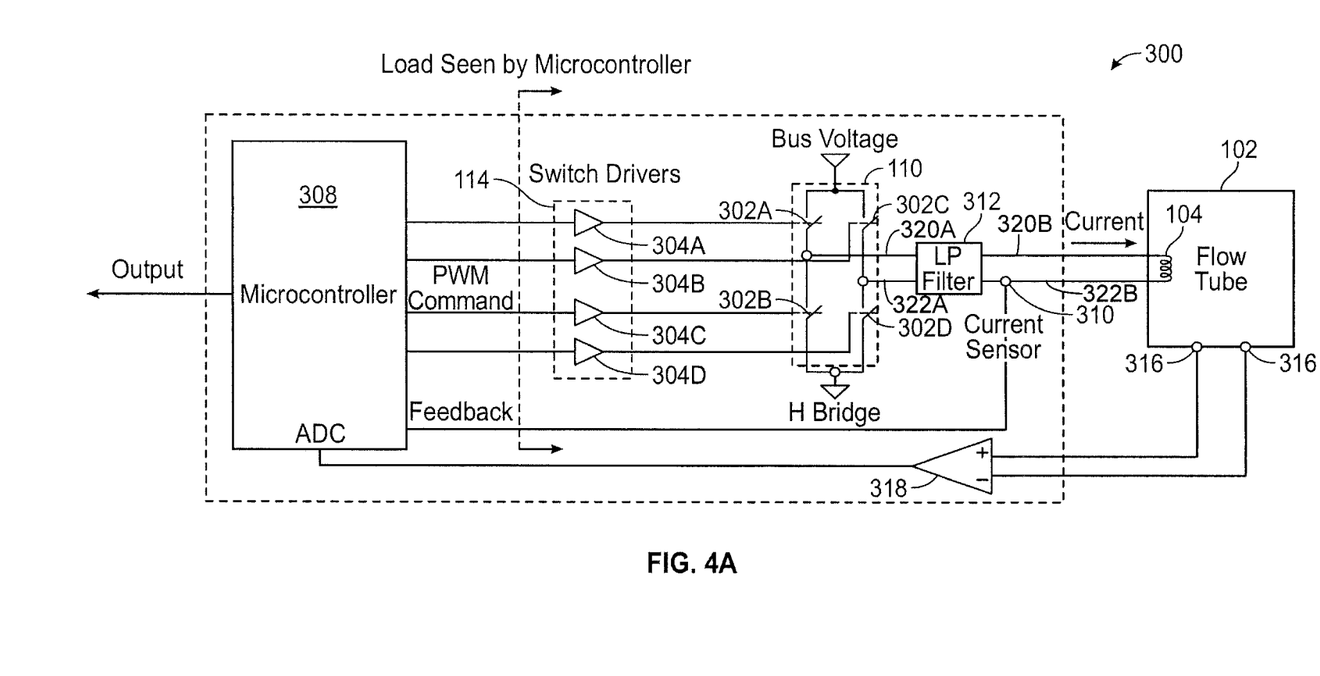
FIGS. 4A and 4B are simplified schematic diagrams of coil driver circuitry for driving a coil in a magnetic flowmeter using Pulse Width Modulation (PWM).
Figure 4B:
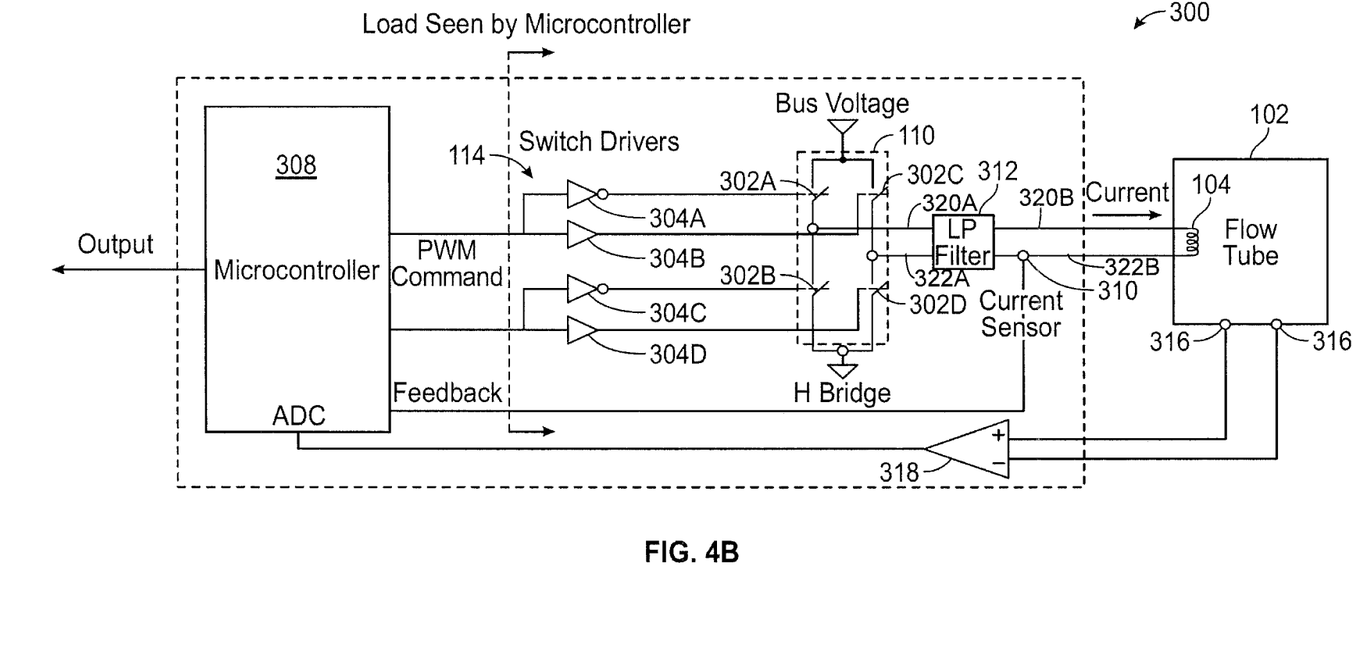

Instead of traditional coil drivers where the current through an inductive load is controlled by primarily by analog circuit, a complete digital coil driver is provided as seen in FIGS. 4A and 4B. FIG. 4A shows a magnetic flowmeter 300 using digital coil drive circuitry in accordance with one example embodiment. Components in FIGS. 4A and 4B which are similar to those shown in FIG. 2 have retained their numbering. In contrast to the predetermined fixed control schemes implemented by conventional controllers 200 that cannot be adapted to changing flow tube parameters, with the digital coil driver set forth herein, the current profile can be controlled by controlling the signals used to operate the H-bridge circuitry. More specifically, switches in the H-bridge can be controlled using PWM (Pulse Width Modulated) command input signals.

As illustrated in FIG. 4A, an H Bridge driver 110 is connected between a bus voltage and electrical ground and includes four switches 302A, 302B, 302C and 302D which are, for example, field effect transistors or the like. The switches 302B is complementary to switch 302A, and the switch 302D is complementary to the switch 302B. Switch drivers 114 are illustrated as four analog drive circuits 304A, 304B, 304C and 304D. The individual switch drivers 304A-304D receive PWM commands from a microcontroller 308. FIG. 4B illustrates a slightly different configuration of flowmeter 300, in the which switch drivers 304A and 304C are inverting drivers. This allows two PWM command signals to be applied by the microcontroller 308 as opposed to the configuration of FIG. 4A in which four such command signals are used.

The H bridge 110 is configured to receive an unfiltered current from the bus voltage or power supply. The microcontroller 308 controls the switch pairs 302A and 302C, and 302B and 302D to generate high frequency (e.g., 10-100 kHz) current pulses from the unfiltered current, which are delivered to the low pass filter (LPF) 312 over conductors 320 and 322. The low pass filter (LPF) 312 operates to attenuate the high frequency current pulses from the H bridge 110 output on conductors 320A and 322A, to form low frequency (e.g., 5-100 Hz) coil current pulses on corresponding lines 320B and 322B that form the coil current that is delivered through the coil 104.

Figure 5A:
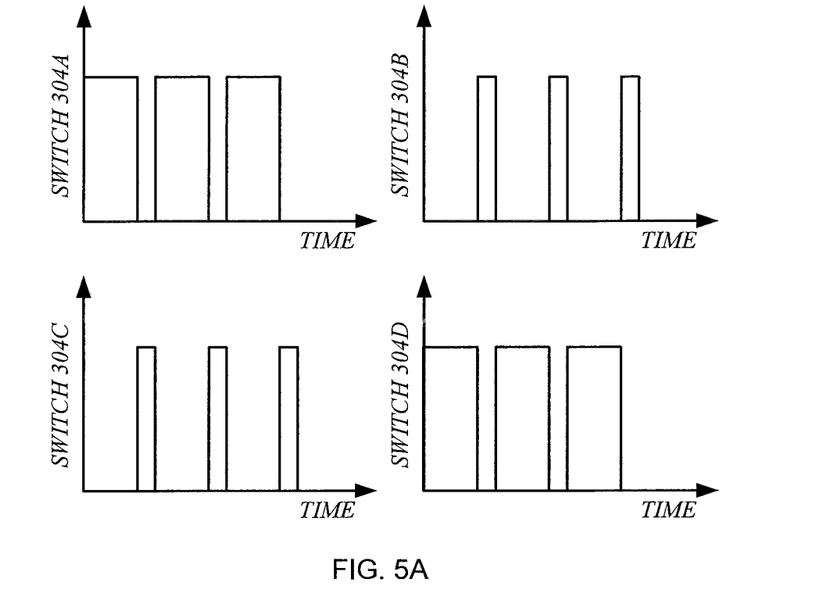
FIGS. 5A and 5B are charts illustrating exemplary control signals from a microcontroller to the switches of an H bridge, in accordance with embodiments of the present disclosure.
Figure 5B:
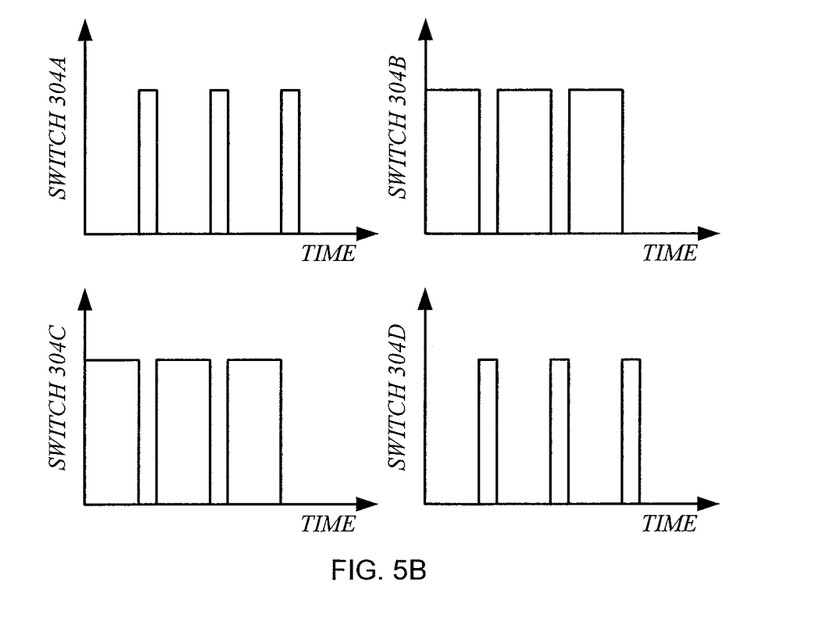

The microcontroller 308 controls the direction the filtered coil current flows through the coil 104 by modulating a duty cycle of the switches 302. FIGS. 5A and 5B are charts illustrating exemplary control signals from the microcontroller 308 to the switches 302 that cause the coil current to flow in opposing directions through the coil 104. In general, a series of narrow (short duration, low duty cycle) pulses for the switches 302A or 302B will cause corresponding short current pulses in the lines 320A or 322A. When these high frequency short current pulses are passed through the LPF 312, the result is a low DC voltage on the corresponding line 320B or 322B. Similarly, a series of wide (long duration, high duty cycle) pulses will cause a high DC voltage to be applied to the corresponding line 320A or 322A. When these high frequency long current pukes are passed through the LPF 312, the result is a high DC voltage on the corresponding line 320B or 322B. For example, when the switches 302 are actuated by the microcontroller 308 as indicated in FIG. 5A, the duty cycle for the switch 302A is greater than the duty cycle for the switch 302B, and the duty cycle for the switch 302C is less than the duty cycle for the switch 302D. This causes the average voltage in the line 320B to be greater than the average voltage in line 322B, resulting in the coil current flowing in the direction indicated in FIG. 4A. When the control signals are in accordance with those shown in FIG. 5B, the duty cycle for the switch 302A is less than the duty cycle for the switch 302D. This causes the average voltage in the line 322B to be greater than the average voltage in line 320B, resulting in the coil current flowing in the opposite direction from that indicated in FIG. 4A.

Thus, by controlling the PWM command signals applied to the H Bridge 110, the microcontroller 308 can control the amplitude, rate of change, and shape of the current signal applied to the coil 104. This technique for adjusting the direction and magnitude of the coil current is distinct from conventional power amplifiers of magnetic flowmeters 102 that use an H bridge to simply route a current from a power supply in alternating directions through coils of a flow tube assembly.

A current sensor 310 is used to sense the current applied to the coil 104. This sensed current provides a feedback signal to an analog to digital converter (ADC) of microcontroller 308. The current sensor 310 can be in accordance with any appropriate technology such as a measured voltage drop across a series resistance.

FIG. 4A also illustrates EMF sensors 316 which are electrically coupled to the fluid in the flow tube 102 and may comprise, for example, electrodes. A differential amplifier 318 receives output signals from the EMF sensors 316 and provides an amplified differential signal to an analog to digital converter (ADC) of microcontroller 308. As discussed previously, the magnitude of the voltage between EMF sensors 316 is related to the flow rate of the process fluid flowing through the flow tube 102.

Figure 6:
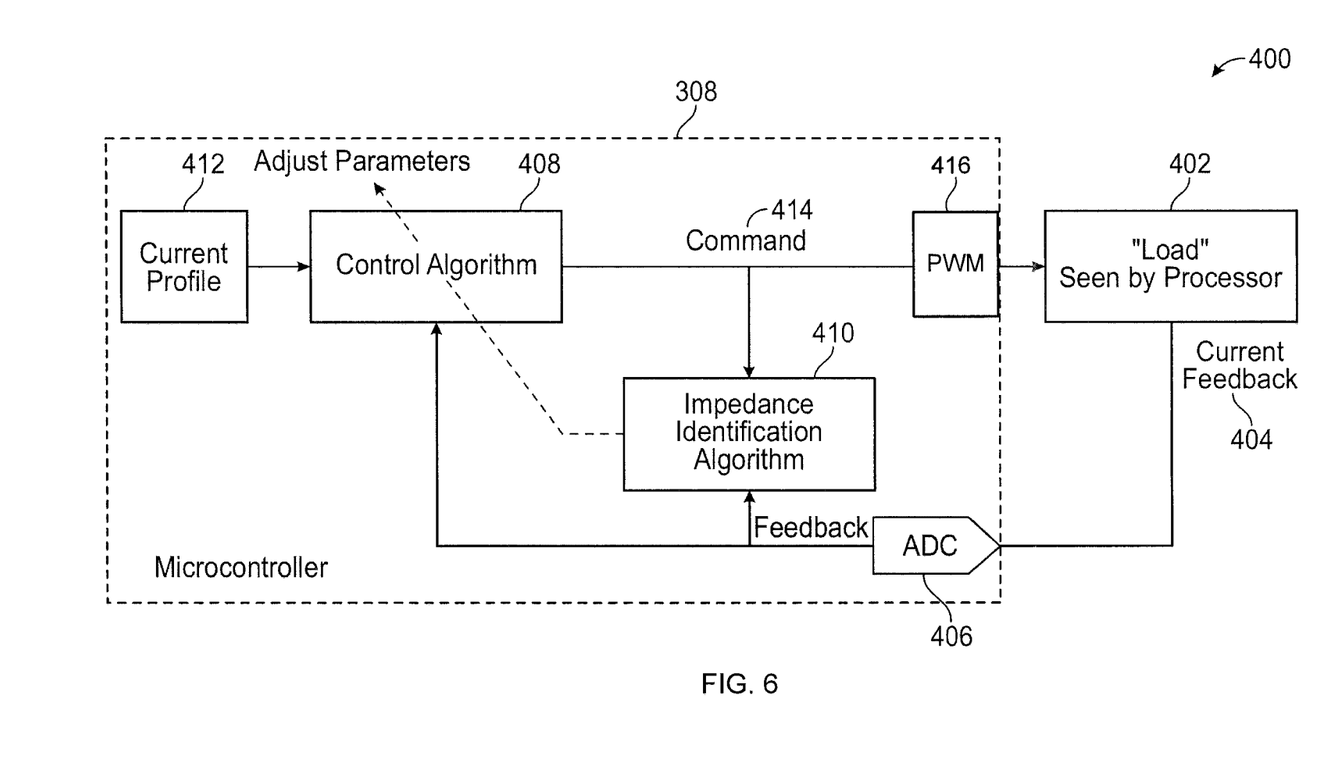
FIG. 6 is a block diagram of adaptive coil drive digital circuitry.

In the digital coil driver configuration of FIGS. 4A, 4B, microcontroller 308 uses PWM commands applied to the H bridge circuit 110 to control the current into the flow tube 102. Further, the PWM commands can be determined based upon the current feedback sensed by current sensor 310 and the control algorithm is implemented digitally in the microcontroller 308. This is illustrated in FIG. 6, which is diagram of a continuously adaptive digital coil driver 400. The diagram of FIG. 6 illustrates microcontroller 308 coupling to a "load" 402 which is the effective load from the coil 104 along with other components in the current path as seen by the microcontroller circuitry 308 at the switch driver 114. Current through load 402 is sensed by sensor 310 which provides the current feedback 404. The sensed current feedback 404 is converted into a digital value using analog to digital converter 406 and is applied to a control algorithm 408 and an impedance identification algorithm 410. The control algorithm 408 operates in accordance with a selected current profile 412 to control operation of the switches 302A-D in the H Bridge 110, which, along with the LPF 312, is represented in FIGS. 5A and 5B as the PWM 416. The control algorithm provides command signals 414 to the PWM 416 and to the impedance identification algorithm 410. The impedance identification algorithm 410 determines the impedance of the load 402 by comparing the digitized current feedback 404 with the command signal 414 provided by the control algorithm 408. Based upon the identified impedance by the impedance identification algorithm 410, the impedance identification algorithm adjusts the control parameters used by the control algorithm 408 to adapt to the specific impedance provided by load 402.

In operation, upon power up, the load impedance connected to the coil driver may not be known. To identify the electrical characteristics (Impedance) of the connected load, the microcontroller 408 initially excites the load in open loop (no feedback based control) using a small excitation signal (voltage) and measures the current feedback. In the non-ideal case where there is a non-linear relationship between the voltage and current (most inductor core material exhibits hysteresis characteristics and the impedance of the coil 104 is a function of its operating current), the microcontroller 308 increases the applied voltage and measures the current until a desired operating current setpoint is achieved. The Impedance Identification Algorithm 410, then calculates the "Load" impedance using known techniques and the microcontroller then calculates the optimum tuning parameters for the control loop. For example, a step voltage input can be applied to the coil 104. By monitoring the rise time of the resultant current using current sensor 110, the inductance of coil 104 can be determined, as well as the value of any parasitic resistance. The microcontroller 308, then closes the current loop using the initially calculated tuning parameters. The impedance of the flow tube 102 will change over time due to environment (such as the temperature of the flow tube 102), while operating in closed loop, the Impedance Identification Algorithm 410 continuously measures the impedance of the flow tube. After passing the new impedance through a low pass filter, the microcontroller calculates the new optimum control loop parameters for the implemented control scheme. In this way, the magnetic flowmeter coil driver continuously operates at or near optimum performance. This reduces or substantially eliminates overshoot and also provides a fast settling time allowing for fast coil frequency response.

Thus, the microcontroller uses knowledge of current feedback to calculate the impedance of the flow tube and derive optimum tuning parameters (for the applied control law) after power up. By continuous impedance measurement, the microcontroller can maintain this optimum performance by adjusting tuning parameters as the flow tube's parameters (impedance) change due to, for example, changing environmental conditions (e.g., temperature) and aging effects. Since the control law is implemented digitally inside the microcontroller, the microcontroller can also decode the proper PWM signal or commands and directly apply them to the switches of the H bridge switches to control current through the flow tube. Additionally, the magnetic flowmeter can be adapted to operate with new flow tubes automatically and without a predefined control scheme as with conventional magnetic flowmeters.

Although the present invention has been described with reference to preferred embodiments, workers skilled in the art will recognize that changes may be made in form and detail without departing from the spirit and scope of the invention. The configuration provides optimum performance for any attached flow tube. Further, the system adapts to flow tube parameter changes due to temperature changes and age. The microcontroller can be in accordance with any technology, for example, it can be implemented in a microcontroller. In the magnetic flowmeter set forth herein, a square (or trapezoidal) current waveform is created by the coil driver. It is desirable that after a current/magnetic field transition for the system to reach a steady state as soon as possible. During steady a state magnetic field, the flow tube electrode voltage is sensed and flow is calculated. It is assumed that magnetic field is known when current is in steady state (or shortly after). The higher the frequency of flow measurement, the lower "1/f" noise (Pink noise). Thus, it is desirable to optimize the settling time of the magnetic field (or current) (or minimize its settling time). Further, if the current overshoots in a coil, in some magnetic materials, the magnetic field may settle to different magnetic field strength than if there was no overshoot. Since in flow tubes, magnetic field strength is measured from the current magnitude, current overshoot may result in measurement error in some systems. The digital control circuitry set forth herein can be used to control the current supplied to the coil to optimize the factors.

What is claimed is:

1. A magnetic flowmeter for measuring a fluid flow, comprising:
   a flow tube assembly receiving the flow having a coil with first and second coil wires for receiving a coil current producing a magnetic field generating an EMF in the fluid representative of the flow;
   an EMF sensor arranged to sense the EMF and generate an output indicating the flow;
   current supply circuitry configured to provide the coil current to the first and second wires of the coil in response to a command input; and
   digital control circuit which provides the command input to the current supply circuitry as a function of a control algorithm,
   wherein the command input comprises a pulse wave modulated (PWM) signal that controls a direction the coil current travels through the coil.

2. The magnetic flowmeter of claim 1 wherein the current supply circuitry includes a current source and at least one switch for selectively coupling the current source to the coil.

3. The magnetic flowmeter of claim 2 wherein the PWM signal is applied to the at least one switch.

4. The magnetic flowmeter of claim 1, including a low pass filter which connects the current supply circuitry to the coil to provide a DC coil current to the coil.

5. The magnetic flowmeter of claim 1 wherein the control algorithm is configured to control the command input as a function of a current profile.

6. The magnetic flowmeter of claim 5 wherein the current profile includes at least one of amplitude, frequency, waveform and overshoot.

7. The magnetic flowmeter of claim 1 wherein the digital control circuitry includes an impedance identification algorithm configured to determine an impedance of the coil and the command input is a function of the determined impedance.

8. The magnetic flowmeter of claim 7 wherein the impedance identification algorithm receives a current feedback signal related to current through the coil for use in determining impedance of the coil.

9. The magnetic flowmeter of claim 1 wherein the current supply circuitry includes four switches configured to control the current through the coil.

10. The magnetic flowmeter of claim 9 wherein the command input comprises four signals individually applied to each of the four switches.

11. The magnetic flowmeter of claim 9 wherein the command input comprises two signals applied to two pairs of the four switches.

12. The magnetic flowmeter of claim 1 wherein the control algorithm configured to generate the command input as a function of a sensed current flowing through the coil and the digital control circuit includes:
   an impedance identification algorithm configured to identify impedance of the coil as a function of the sensed current and the command input and responsively control parameters of the control algorithm.

13. The magnetic flowmeter of claim 1 wherein parameters of the control algorithm are adapted to changes in electrical parameters of the coil.

14. A method for measuring flow of a process fluid using a magnetic flowmeter, comprising:

receiving a flow of process fluid through a flow tube assembly having a coil with first and second wires for receiving a coil current and responsively producing a magnetic field and generating EMF in the fluid representative of a flow rate;

sensing the EMF with a sensor and generating an output indicating flow rate;

providing the coil current to the first and second wires of the coil using current supply circuitry which is responsive to a command input;

generating the command input comprising a pulse wave modulated (PWM) signal; and controlling a direction the coil current travels through the coil comprising applying the command input to the current supply circuitry.

15. The method of claim 14 wherein the control algorithm is configured to control the command input as a function of a current profile.

16. The method of claim 15 wherein the current profile includes at least one of amplitude, frequency, waveform and overshoot.

17. The method of claim 14 wherein the digital control circuitry includes an impedance identification algorithm for determining an impedance of the coil and the command input is a function of the determined impedance.

18. The method of claim 17 wherein the impedance identification algorithm receives a current feedback signal related to current through the coil for use in determining impedance of the coil.

19. A magnetic flowmeter for measuring a fluid flow, comprising:

a flow tube assembly receiving the flow having a coil with first and second coil wires for receiving a coil current producing a magnetic field generating an EMF in the fluid representative of the flow;

an EMF sensor arranged to sense the EMF and generate an output indicating the flow;

current supply circuitry configured to provide the coil current to the first and second wires of the coil in response to a command input; and digital control circuit which provides the command input to the current supply circuitry as a function of a control algorithm, wherein:
the current supply circuitry includes four switches configured to control the current through the coil;
the command input comprises a pulse wave modulated (PWM) signal that is applied to each of the four switches; and
a direction the coil current travels through the coil is controlled by the command input.

* * * * *